CIRCUIT-CONDITION INDICATING SYSTEM

Filed Dec. 27, 1960

INVENTOR.
JOSEPH F. BRUMBACH
BY
Horton, Davis, Brewer & Brugman
Att'ys.

United States Patent Office 3,213,194
Patented Oct. 19, 1965

3,213,194

CIRCUIT-CONDITION INDICATING SYSTEM

Joseph F. Brumbach, Niles, Ill., assignor, by mesne assignments, to Victor Comptometer Corporation, Chicago, Ill., a corporation of Illinois Filed Dec. 27, 1960, Ser. No. 78,569
2 Claims. (Cl. 178—18)

Figure 1:
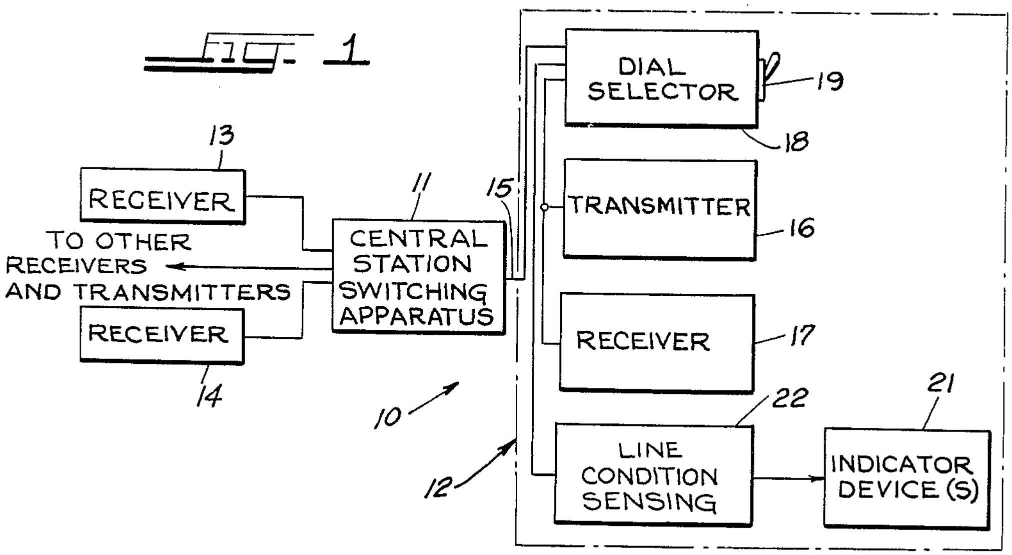

This invention relates to a new and improved circuit-condition indicating system for a transmitter in a graphic communication system, and more particularly to a circuit-condition indicating system for a graphic communication transceiver station which affords a positive indication of the condition of the transmission circuits available to the station when operating as a transmitter and which prevent spurious operation of the receiver portion of the station in response to received circuit-condition signals.

In a graphic communication system, each transmitter includes means for developing data signals representative of movement of a stylus or the like across a recording surface and into and out of contact with the recording surface. The receivers of the system utilize these data signals to reproduce the movements of the transmitter stylus, thereby affording means for duplicating any data recorded at the transmitter. Frequently, it is desirable to incorporate transmitters and receivers in a system which permits each transmitter to control a number of different receivers, individually or in groups. To this end, the transmitters and receivers may be connected to central station equipment which is essentially similar to that employed for conventional telephone systems. The central station equipment usually includes the customary signalling means for developing a signal indicating that a circuit is available for use, signals of this kind being referred to hereinafter under the customary name of "dial signal." The central station equipment also includes means for developing a signal indicating that a circuit is not available, being already in use, signals of this kind being referred to hereinafter under the usual term of "busy signal." In conventional telephone equipment, the dial signal is usually a continuous tone signal of relatively low frequency, whereas the busy signal is in the same frequency range but is intermittent in nature.

Heretofore, it has been customary to provide voice transmission equipment, such as ordinary telephones, for use with a graphic communication system of the kind described generally hereinabove, in order to enable the operators using the graphic communication system to control its operations effectively. In some applications, however, it is not desirable to provide voice equipment of this kind, particularly where other telephone facilities are already available and where it is not practical or desirable to use the telephone circuits in the graphic communication system. Thus, it may be necessary to provide adequate signalling facilities, as a part of the graphic communication system, to enable the station operators to determine whether or not effective transmission can be accomplished.

The signalling apparatus employed must provide means for differentiating between available circuit facilities and busy facilities. Because the principal signal transmission is based upon graphic data, which is interpreted visually, it is frequently desirable that the circuit-condition indication be a visual one. This is particularly true in noisy environments, such as manufacturing plants and the like. At the same time, it may be necessary to protect the receiver equipment of the graphic communication system against signals other than the data signals required for operation thereof. This is particularly true because, in many instances, a transmitter is associated with a receiver in a transceiver station and only one circuit is provided between the transceiver to the central station equipment, this circuit being used for both transmission and reception.

It is a primary object of the invention, therefore, to provide a new and improved circuit-condition indicating system for a transmitter in a graphic communication system of the kind comprising a plurality of transmitters and receivers which may be interconnected through substantially conventional central station equipment.

A more specific object of the invention is to provide a positive visual indication of circuit conditions for a transmitter in a graphic communication system and to differentiate positively between a busy condition and an available circuit condition.

Another object of the invention is to protect the receiver in a graphic communication transceiver station against extraneous operation in response to circuit-condition signals received from a central station to which the transceiver is connected.

A particular object of the invention is to avoid any necessity for using voice circuits for effective control of the transmitter and receiver apparatus in a graphic communication system utilizing telephone-type central station equipment to interconnect a plurality of transmitters and receivers.

It is a corollary object of the invention to provide a new and improved circuit-condition indicating system for a transmitter in a graphic communication system which is simple and economical in construction and highly effective in operation.

Accordingly, the present invention relates to a circuit-condition indicating system for a transmitter in a graphic communication system of the kind comprising a plurality of transmitters and a plurality of receivers electrically coupled to a central station. The central station includes the usual switching and circuit means for coupling the transmitters to selected receivers, and also includes circuit-condition signal means for selectively supplying, to each transmitter, a dial signal indicative of a circuit available for use or a busy signal indicative of a circuit already in use. In accordance with the invention, the indicating system comprises signal selection means, coupled to the output circuit of the transmitter, for developing a pair of control signals which are individually different from each other and which are representative of the dial signal and the busy signal, respectively. The indicating system further includes at least one indicator device, preferably a lamp or other visual indicator, for generating a sensible signal in response to an electrical signal input. Coupling means are provided for energizing the indicator device in accordance with the control signals from the signal selection means to produce two distinct and distinguishable sensible signals directly indicating, to a transmitter operator, whether the circuit in which the transmitter is coupled is available for use or is already being used. In the preferred embodiment described hereinafter, the indicating system further includes means for preventing transmission of the dial signal and the busy signal to a receiver associated with the transmitter in a transceiver station in order to prevent spurious operation of the receiver in response to these signals.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes my be made as desired by those skilled in the art without departing from the the present invention.

Figure 2:
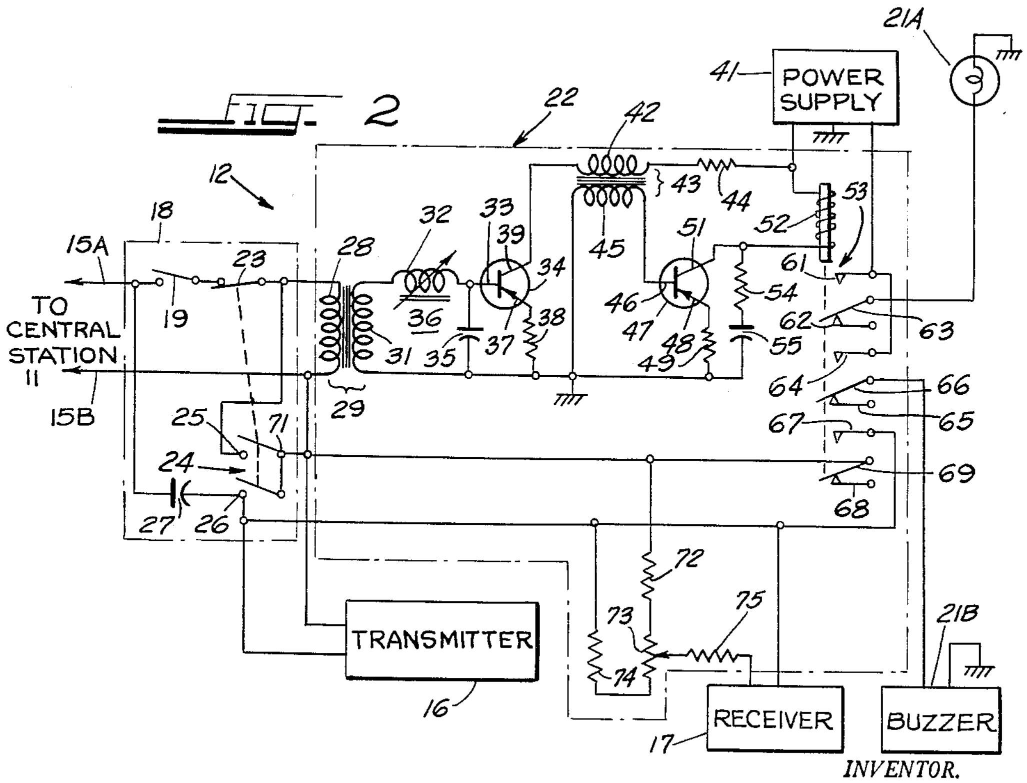

In the drawings:

FIG. 1 is a block diagram of a graphic communication system including a transceiver station in which an indicating system constructed in accordance with the present invention is incorporated; and FIG. 2 is a detail circuit diagram of a preferred embodiment of the indicating system of the present invention.

FIG. 1 illustrates, in block diagram form, a graphic communication system 10 of the kind comprising a plurality of transmitters and a plurality of receivers all coupled to a central sttaion 11. The central station 11 includes the usual switching and circuit means for selectively coupling the transmitters of the system to the receivers. Only a portion of the system 10 as illustrated in FIG. 1, including particularly a transceiver 12 and two receivers 13 and 14. It should be understood, however, that the central station 11 is connected to additional receivers and transmitters. Furthermore, the receivers 13 and 14 need not be isolated receiver instruments, but may be associated with transmitters in complete transceiver stations.

In addition to the switching and circuit means for coupling each transmitter of the system to a selected receiver, the central station 11 includes means for developing and supplying to the transmitters the usual dial signal indicative of a circuit available for use and a conventional busy signal indicative of a circuit already in use. The apparatus employed for generating these circuit-condition signals may be entirely conventional in construction and operation and, accordingly, is not described in detail herein. In accordance with the usual practice the dial signal is a continuous tone signal of relatively low frequency, usually of the order of 600 cycles per second. The busy signal is an intermittent signal at about the same frequency.

The transceiver station 12, which is connected to the central station 11 by means of a suitable transmission line or other link 15, includes a graphic communication transmitter 16 and a graphic communication receiver 17. Both the transmitter and the receiver are connected to the transmission line 15, as described in greater detail hereinafter in connection with FIG. 2. The transceiver 12 further includes a dial selector or switch 18. The selector 18 may be essentially similar in construction to the dial switching devices employed in conventional telephones and is utilized to actuate the operating circuit of central station 11 to connect the transmitter 16, selectively, to any one of the receivers of the system 10, such as the receivers 13 and 14. The dial selector 18 includes a manually operable on-off switch 19 for effectively connecting and disconnecting the dial selector 18, signal or indicator devices 21, and a line-condition sensing means 22. The transmitter 16 and receiver 17 are effectively coupled to the line 15 whether or not the switch 19 is closed.

In operation, the manually operated switch 19 is actuated to afford a circuit connection from the dial selector 18 to the central station 11 through the connecting line or other coupling link 15. When this is done, a dial signal may be received from the central station 11, indicating that there are operating circuits available for use through the central station. If the central station 11 includes fewer operating circuits than there are possible connections of transmitter-receiver connections, and all of the operating circuits are already in use, a busy signal is applied to the transceiver 12 through the connecting line 15. If a dial signal is received, the dial selector 18 may be actuated to afford a connection from the transceiver 12 to another station such as the receiver 13, this portion of the operation being essentially similar to receiver selection in a conventional dial telephone system. After dialing is completed, the central station 11 supplies a busy signal to the transceiver 12 if the operating circuit to the selected receiver is already in use. The dial and busy signals are utilized by the present invention as described more fully hereinafter.

With respect to data transmission, the system 10 may be substantially conventional. For example, the basic graphic communication apparatus may be of the kind described and claimed in Patent No. 2,583,535 to Robert Adler, and Patent No. 2,583,720 to Robert Adler, both issued January 29, 1952. In a system of this kind, a stylus incorporated in the transmitter 16 is utilized to record a message or other data at the transmitter. The movements of the stylus across the transmiter. The movements of the stylus across the transmitter recording medium, and into and out of contact therewith, are translated into data signals which, in turn, are transmitted to the selected receiver such as the receiver 13. In the receiver, these data signals are used to control operation of another recording stylus and to record, at the receiver, the same data that is transcribed at the transmitter. In a preferred system, frequency modulated data signals are employed, all data being transmitted by signals within a predetermined range of the order of 1200 to 2500 cycles per second. A preferred FM system is described in detail in the co-pending application of Robert Adler and Myron L. Anthony, Serial No. 38,995, filed June 27, 1960, issued June 12, 1962, as U.S. Letters Patent No. 3,038,960. Thus, the data signals employed for the transmission of graphic information in the system 10 are confined to a predetermined frequency range which does not include the frequencies used for the dial and busy signals developed by the central station apparatus 11.

The transceiver station 12 further includes one or more indicator devices generally indicated by the reference numeral 21. The indicator devices 21 are coupled, through the selector 18, to the input-output circuit comprising the transmission line 15, by means of a line-condition sensing means 22. The line-condition sensing means 22 includes signal selection means for developing a pair of control signals that are individually different from each other and that are representative, respectively, of the dial signal and the busy signal. In addition, the line-condition sensing apparatus 22 includes coupling means for energizing the indicator device or devices 21 in accordance with these control signals to produce two distinct sensible signals. One of these sensible signals indicates directly, to an operator using the transceiver station 12, that the circuit to which the transmiter is coupled is available for use, whereas the other indicates that the circuit is busy.

The circuit-condition indicating system of the transceiver 12, comprising the dial selector 18, the line-condition sensing apparatus 22, and the indicator devices 21, is shown in detail in the circuit diagram of FIG. 2, in association with the other operating units of the transceiver 12. As illustrated therein, the transmission line 15 comprises a two-wire circuit 15A, 15B. The manually actuated control switch 19, which is a normally open device, is connected in series in the line 15A. Also connected in series in the line 15A is a normally closed dial switch 23 which is mechanically connected to a center-off-normal switch 24 to form a conventional dial switching arrangement. The switch 24 is shown as a double-pole double-throw switch having one pole 25 connected to the line 15A at a point following the dial switch 23. The other pole 26 of the switch 24 is coupled to the line 15A, at a point ahead of the manual switch 19, by means of a coupling capacitor 27.

The input winding 28 of a coupling transformer 29 is connected across the transmission line 15A, 15B which comprises the input-output circuit of the transceiver 12. One terminal of the secondary winding 31 of the transformer 29 is connected through a variable inductance 32 to the base electrode 33 of a transistor 34. A capacitor 35 is connected from the base electrode 33 to ground to afford, in conjunction with the variable inductance 32, a low-pass filter 36 in the input circuit of the transistor 34.

The emitter 37 of the transistor 34 is returned to ground through a resistor 38. The collector 39 of the transistor is connected to a suitable power supply 41 by means of a circuit which includes, in series, the primary winding 42 of an interstage coupling transformer 43, and a load resistor 44. The power supply 41 need not be an independent power supply circuit, but may be a part of the power supply for either the transmitter 16 or the receiver 17.

The coupling transformer 43 includes a secondary winding 45 having one terminal connected to the base electrode 46 of a second transistor 47, the other terminal of the transformer secondary being grounded. The emitter electrode 48 of the transistor 47 is returned to ground through a resistor 49. The collector electrode 51 of the second stage transistor is connected to the power supply 41 by means of a circuit which includes, in series, the operating coil 52 of a relay 53. The collector 51 is also returned to ground through a circuit comprising, in series, a resistor 54 and a relatively large capacitor 55.

The relay 53 is a three-pole double-throw relay. The first set of contacts comprises a pair of fixed contacts 61 and 62 engageable by a moveable contact 63. When the relay is in its normal or unactuated condition, the movable contact 63 engages the fixed contact 62 but when the relay 53 is in its actuated or energized condition the contact 63 engages the other fixed contact 61. The fixed contact 61 is connected to the power supply 41, whereas the fixed contact 62 is left open-circuited. The movable relay contact 63 is connected to an indicator device comprising an indicator lamp 21A, the lamp being returned to ground.

The second set of contacts for the relay 53 comprises a fixed contact 64, a second fixed contact 65, and a movable contact 66 that is normally engaged with the contact 65. The fixed contact 64 is connected to the power supply 41 and the other fixed contact 65 of this set is left open-circuited. The movable contact 66 is connected to a second indicator device comprising a buzzer 21B that is suitably returned to ground.

The third set of contacts for the relay 53 comprises a first fixed contact 67, a second fixed contact 68, and a movable contact 69. The movable contact 69 is connected directly to the one side 15B of the input-output circuit for the transceiver. The normally closed contact 68 is left open-circuited. The remaining fixed contact 67 is connected to terminal 26 of the dial switch 24, and hence is coupled to the other side 15A of the input-output circuit throught the capacitor 27.

The transmitter apparatus 16 of the transceiver station 12 is connected to the input-output circuit 15A, 15B. Thus, one output terminal of the transmitter is connected directly to the line 15B, also being connected to the common terminal 71 of the center-off-normal switch 24. The other output terminal of the transmitter is connected to the switch terminal 26 and hence is coupled to transmission line 15A by means of the coupling capacitor 27. A similar circuit is used for the receiver 17, one input terminal of the receiver being directly connected to the terminal 26 of the dial switch 24 and thus to the line 15A through the capacitor 27. The other input terminal to the receiver is connected to an attenuating circuit comprising the resistors 72, 73 and 74 connected in series with each other across the incoming line. The resistor 73 comprises a potentiometer, and the tap on the potentiometer is connected through a resistor 75 to the second input terminal of the receiver 17.

In considering operation of the transceiver 12, as illustrated in FIG. 2, it may first be assumed that the transceiver operator desires to transmit data to one of the receivers 13 and 14 (FIG. 1). Under these circumstances, the first thing done by the operator is to close the manual switch 19, connecting the transformer primary 28 across the two sides 15A and 15B of the input-output circuit that links the transceiver 12 to the central station 11. If the central station circuits are not all busy, this results in the application of a dial signal from the central station 11 to the transceiver and particularly to the primary winding 28 of the coupling transformer 29.

As noted hereinabove, the dial signal is a continuous tone signal of relatively low frequency; consequently, the dial signal is translated through the low-pass filter 36 without substantial attenuation and is applied to the input electrode, the base electrode 33, of the first transistor 34. The illustrated circuit for the transistor 34 is an amplifier. Consequently, the control signal appearing at the collector electrode 39 of the transistor is amplified and is supplied to the base electrode 46 of the second transistor 47 through the coupling circuit comprising the transformer 43. The "dial" control signal is again amplified in the amplifier circuit comprising the transistor 47 and is applied to the operating coil 52 of the relay 53. Accordingly, the relay 53 is actuated from its normal or de-energized position, as shown in FIG. 2, to its actuated or energized condition, closing the movable contacts 63, 66 and 69 upon the associated contacts 61, 64 and 67, respectively.

As long as the condition described above is maintained, and the dial signal from the central station 11 is supplied to the line-condition sensing circuit 22, the relay 53 remains actuated. This being the case, the indicator lamp 21A is energized through a circuit comprising, in series, the power supply 41, the relay contacts 61 and 63, and the return circuit to ground. If a second device for producing a sensible signal, such as the buzzer 21B, is employed, this device is also energized through a similar circuit comprising the power supply 41, the relay contacts 64 and 66, and the ground return. Thus, the received dial signal from the central station 11 is effectively selected in the low-pass filter 36 and is utilized to develop a dial control signal which is applied to the coupling circuit comprising the two transistor amplifiers and the relay 53. Actuation of the relay 53 effectively energizes the lamp 21A and the buzzer 21B. Thus, these indicator devices are energized in accordance with the continuous control signal output from the low-pass filter 36, thereby indicating to the operator that the transmission line 15A, 15B is available for use.

If the dial signal were applied to the input circuit of the receiver 17 it might cause spurious operation of the receiver and might even damage the operating mechanism of the receiver, depending upon the amplitude of the dial signal. Further, the dial signal might also adversely affect the transmitter 16 if applied thereto. This is prevented, however, in the circuit illustrated in FIG. 2, by the closing of the relay contacts 67 and 69. Thus, when these contacts are closed, the input circuit of the receiver 17 and the output circuit of the transmitter 16 are both effectively shorted out, so that no substantial signal can be supplied to either the transmitter or the receiver. Accordingly, these devices are not actuated to spurious operation or otherwise adversely affected in response to the received dial signal.

With the switch 19 closed, the dial selector 18 comprising the conventional dial switches 23 and 24 may be utilized to select a desired receiver in conventional manner. The dialing operation is, as noted hereinabove, the same as in a conventional dial telephone. During dialing, the input to the transmitter 16 is effectively shorted by the center-off-normal switch 24 in the usual manner.

When the dialing operation is completed, a circuit may be established to one of the receivers, in which case transmitter and receiver operation are continued in the usual manner. It may happen, however, that the selected receiver is already in use, being connected to another transmitter in the system 10. Under these circumstances, a busy signal is transmitted from the central station 11 to the transceiver 12. This signal is in the same general frequency range as the dial signal but is intermittent in nature. The received busy signal is within the pass band of the low-pass filter 36; consequently, an intermittent control signal representative of the busy signal is supplied to the coupling means comprising the transistor amplifiers 34 and 47 and the operating coil 52 of the relay 53. Accordingly, the relay 53 is again actuated, completing the energizing circuits to the indicator devices 21A and 21B. In this instance, however, a lamp 21A and the buzzer 21B are energized intermittently, due to the intermittent nature of the received busy signal. Thus, the operator is able to distinguish this condition from the condition described hereinabove in which the continuous dial tone is received from the central station 11. As before, whenever the busy signal energizes the relay 53, the input to the receiver 17 is shorted out through the relay contacts 68 and 69, so that the busy signal is not supplied to the receiver and hence cannot cause undesired operation thereof. Of course, if a busy signal is received from the central station immediately upon closing of the manual control switch 19, indicating that all of the central station circuits are already busy, the operation of the indicating system of FIG. 2 is the same as when a busy signal is received after a dialing operation.

When the transceiver is actually in use as a transmitter, or as a receiver, the switch 19 may be closed or left open, without substantial effect on operation, as long as the impedance of transformer 29 is relatively high as compared with the receiver input impedance and the transmitter output impedance. Thus, closing of the switch 19 does not prevent the reception of incoming graphic data signals from the central station 11 to the receiver 17, or the transmission of data signals thereto, since the receiver and transmitter are still connected to the input-output circuit 15A, 15B and are not shorted by the relay contacts.

During operation of the transceiver 12, with the switch 19 closed, the received data signals required to actuate the receiver 17 are applied also to the primary winding 28 of the coupling transformer 29 in the input circuit of the line-condition sensing device 22. Furthermore, the data signals to be transmitted from the transmitter apparatus 16 to the central station 11 also are applied to the input winding 28 of the line-condition sensing apparatus. The low-pass filter 36, however, does not translate these signals, at any substantial amplitude, to the coupling circuit comprising the two amplifier stages and the relay. Stated differently, the signal selection means comprising the low-pass filter 36 effectively attenuates the data signals to an extent sufficient that the output signal from the second amplifier stage comprising the transistor 47 is too low in amplitude to actuate the relay 53. Accordingly, the two indicator devices 21A and 21B are not energized in response to either received data signals or transmitted data signals.

In order to afford a more complete disclosure of the preferred embodiment of the invention, specific circuit data are set forth hereinafter. It should be understood, however, that these data are provided merely by way of illustration and in no sense as a limitation on the invention.

| | |
|---|---|
| Transistors **34** and **47** | Type 2N651. |
| Resistors **38** and **49** | 47 ohms. |
| Resistor **44** | 2.2 kilohms. |
| Resistor **54** | 120 ohms. |
| Resistors **72** and **75** | 270 ohms. |
| Resistor **73** | 1000 ohms. |
| Resistor **74** | 10 ohms. |
| Capacitor **27** | 1 microfarad. |
| Capacitor **35** | 0.12 microfarad. |
| Capacitor **55** | 2 microfarads. |
| Transistor operating voltage | −42 volts. |

The dial selector 18 is available commercially; one suitable device is that of Leich Electric Co., Model D-84820C.

From the foregoing description, it is apparent that the circuit-condition indicating system illustrated in FIG. 2 provides a positive visual or audible indication of circuit conditions for the connecting line 15A and 15B, the visual and audible signals being particularly pertinent with respect to operation of transmitter 16 and connection of the transmitter to receivers in the system 10 (FIG. 1). The receiver 17 is effectively protected against extraneous operation in response to dial signals and busy signals received from the central station 11. At the same time, the indicator devices 21A and 21B are not actuated by the data signals utilized to transmit graphic information through the system. Consequently, the circuit-condition indicating system of the invention permits effective control of the transmitter and receiver apparatus of a graphic communication system utilizing telephone-type central station equipment without requiring separate telephones or other similar equipment.

Hence, while preferred embodiments of the invention have been described and illustrated, it is to be understood that they are capable of variation and modification.

I claim:

1. A circuit-condition indicating system for a transmitter in a graphic communication system of the kind comprising a plurality of transmitters, a plurality of receivers, and a central station electrically coupled to said transmitters and receivers, said central station including switching and circuit means for coupling each transmitter to a selected receiver to transmit data signals, in a predetermined frequency range, therebetween and circuit-condition signal means for selectively supplying, to each transmitter, a continuous dial signal indicative of a circuit available for use and an intermittent busy signal indicative of a circuit in use, said dial and busy signals being lower in frequency than said data signal frequency range, said indicating system comprising: signal selection means, comprising a low-pass filter coupled to the output circuit of the transmitter, for developing a continuous control signal representative of the dial signal and an intermittent control signal representative of the busy signal; at least one indicator device comprising an indicator lamp for generating a visual signal in response to an electrical signal input; and coupling means for energizing said indicator lamp continuously in the presence of said dial signal and intermittently in the presence of said busy signal to indicate to a transmitter operator whether the circuit in which the transmitter is coupled is available for use or is busy, said coupling means being effective to prevent energization of said indicator device in accordance with any output signals developed by said signal selection means in response to said data signals.

2. A circuit-condition indicating system for a transmitter in a graphic communication system of the kind comprising a plurality of transmitters, a plurality of receivers, and a central station electrically coupled to said transmitters and receivers, said central station including switching and circuit means for coupling each transmitter to a selected receiver and circuit-condition signal means for selectively supplying, to each transmitter, a dial signal indicative of a circuit available for use and a busy signal indicative of a circuit in use, said dial and busy signals being substantially lower in frequency than said data signals, said indicating system comprising: signal selection means, comprising a low-pass filter coupled to the output circuit of the transmitter, for developing a pair of control signals individually differing from each other and representative of said dial signal and said busy signal respectively, said signal selection means affording relatively high attenuation for said data signals; at least one indicator device for generating a sensible signal in response to an electrical signal input; and coupling means for energizing said indicator device in accordance with said control signals to produce two distinct sensible signals directly indicating to a transmitter operator whether the circuit in which the transmitter is coupled is available for use or is busy, said coupling means comprising an amplifier coupled to said signal selection means and a relay connected to the output of the amplifier, said relay having an actuation threshold level high enough to prevent energization of said indicator device in accordance with any output signals developed by said data signals.

References Cited by the Examiner

UNITED STATES PATENTS

| | | | |
|---|---|---|---|
| 1,613,624 | 1/27 | Stokely | 179—27.2 |
| 1,711,101 | 4/29 | Shanck | 340—253 |
| 1,861,553 | 6/32 | Shanck | 340—253 |
| 1,977,776 | 10/34 | Rea | 340—253 |
| 2,861,131 | 11/58 | Villmann | 179—90.2 |
| 2,901,543 | 8/59 | Braak | 340—171 |
| 2,926,344 | 2/59 | Koehler | 340—253 |
| 3,106,616 | 10/63 | Flavan | 179—84 |
| 3,105,121 | 9/63 | Field | 179—90.2 |

NEIL C. READ, *Primary Examiner.*